United States Patent [19]

Charpenel et al.

[11] Patent Number: 5,536,813

[45] Date of Patent: Jul. 16, 1996

[54] DETERSIVE POLYANHYDROASPARTIC ACIDS AND BIODEGRADABLE HYDROLYSATES THEREOF

[75] Inventors: Maurice Charpenel, Lyons; Jean-Luc Lepage, Francheville, both of France

[73] Assignee: Rhone-Poulenc Chimie, Courbevoie Cedex, France

[21] Appl. No.: 231,666

[22] Filed: Apr. 25, 1994

[30] Foreign Application Priority Data

Apr. 23, 1993 [FR] France .................... 93 04815

[51] Int. Cl.$^6$ .............. C07K 1/02; C07K 1/12; C08G 69/16; C11D 1/10
[52] U.S. Cl. .......... 530/324; 528/312; 530/333; 530/343; 510/533; 510/480; 510/476
[58] Field of Search .............. 252/174.24; 528/312, 528/319, 328; 530/324, 333, 343

[56] References Cited

U.S. PATENT DOCUMENTS

| | | | |
|---|---|---|---|
| 4,363,797 | 12/1982 | Jacquet et al. | 528/328 |
| 4,696,981 | 9/1987 | Harada et al. | 528/367 |
| 4,868,287 | 9/1989 | Sikes et al. | 530/324 |
| 5,057,597 | 10/1991 | Koskan | 528/499 |
| 5,266,237 | 11/1993 | Freeman et al. | 252/174.23 |
| 5,292,864 | 3/1994 | Wood et al. | 528/490 |
| 5,319,145 | 6/1994 | Paik et al. | 528/328 |

FOREIGN PATENT DOCUMENTS

| | | |
|---|---|---|
| 262665A1 | 12/1988 | Germany . |
| 2246786 | 2/1992 | United Kingdom . |
| WO89/01005 | 2/1989 | WIPO . |
| WO92/14753 | 9/1992 | WIPO . |

OTHER PUBLICATIONS

Materials Research Society Symposium, vol. 292, issued 1993, Wheeler et al, "Large Scale Thermally Synthesized . . . ", pp. 277–283.

*Primary Examiner*—Jeffrey E. Russel
*Attorney, Agent, or Firm*—Burns, Doane, Swecker & Mathis

[57] ABSTRACT

Novel polyanhydroaspartic acids (containing not more than 3% of NH groups of the imide moieties thereof relative to the total amount of CH moieties of the succinimide moieties thereof) and the at least 90%±5% biodegradable hydrolysates thereof (containing not more than 3% of primary amide groups relative to the secondary amide groups of the aspartic moieties thereof) are well suited as detergent (co)builders, the former being prepared by thermally polymerizing aspartic acid in the presence of an effective amount of at least one boron compound having at least one B–OH group, or precursor thereof, and the latter by hydrolyzing the polyanhydroaspartic acid thus obtained.

11 Claims, No Drawings

DETERSIVE POLYANHYDROASPARTIC ACIDS AND BIODEGRADABLE HYDROLYSATES THEREOF

BACKGROUND OF THE INVENTION

1. Field of the Invention

The present invention relates to novel polyanhydroaspartic acid polymers or copolymers and hydrolysates thereof which are at least 90%±5% biodegradable, to a process for the preparation of such novel polyanhydroaspartic acids and their hydrolysates, as well as to the use of same as "builders" or "cobuilders" in detergent compositions.

2. Description of the Prior Art

Polyanhydroaspartic acid, also known to this art as polydehydroaspartic acid or simply polysuccinimide, is most typically prepared by thermal condensation of aspartic acid at a temperature on the order of 220° to 230° C. for several hours. It has been observed that the hydrolysates (polyaspartates), obtained by adding a basic reagent to the polyanhydroaspartic acid thus prepared, have a biodegradability in a natural medium which generally does not exceed 75% (EP-A-511,037).

SUMMARY OF THE INVENTION

A major object of the present invention is the provision of novel polyanhydroaspartic acids, the hydrolysates of which exhibit a biodegradability in a natural medium of at least 90%±5%. Thus, it has now unexpectedly been determined that a relationship exists between the degree of biodegradability after hydrolysis of the polyanhydroaspartic acids and the content of certain nonconform moieties present in the molecule before or after hydrolysis.

Briefly, the present invention features novel polyanhydroaspartic acids, the hydrolysates of which have a biodegradability in a natural medium of at least 90%±5%, said novel polyanhydroaspartic acids containing not more than 3%, preferably not more than 2%, of NH groups of its imide moieties with respect to the total number of CH groups of its succinimide moieties.

These various NH groups comprising the imide moieties and CH groups comprising the succinimide moieties may be identified and quantified via proton nuclear magnetic resonance (NMR).

The hydrolysates (polyaspartates) obtained by adding, in the presence of water, a basic reagent to the subject polyanhydroaspartic acids contain not more than 3%, preferably not more than 2%, of primary amide groups with respect to the secondary amide groups included in the aspartic moieties, said aspartic moieties having the formulae:

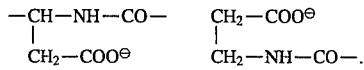

These functional groups may also be identified and quantified via proton nuclear magnetic resonance (NMR).

The present invention also features a process for the preparation of the subject polyanhydroaspartic acids and biodegradable hydrolysates described above.

Briefly, this invention also features a process for the preparation of the subject novel polyanhydroaspartic acids and hydrolysates thereof by thermal polymerization of aspartic acid, optionally mixed with another amino acid, and optionally followed by hydrolysis, said polymerization operation being carried out in the presence of an effective amount of at least one boron compound having at least one B-OH group, or of a precursor of said at least one boron compound.

DETAILED DESCRIPTION OF BEST MODE AND PREFERRED EMBODIMENTS OF THE INVENTION

More particularly according to the present invention, exemplary amino acids which may be copolymerized with aspartic acid include glutamic acid, glycine, alanine, valine, leucine, isoleucine, phenylalanine, methionine, histidine, proline, lysine, serine, threonine, cysteine, and the like, the amount of which advantageously ranging up to 15% by weight, preferably up to 5% by weight, with respect to the total weight of the monomers.

By "precursor of said at least one boron compound" is intended any compound which, under the conditions of the reaction, hydrolyzes to form a boron compound having at least one B-OH group.

Exemplary boron compounds containing a B-OH group, or precursors of boron compounds containing a B-OH group include, in particular:

(i) boric acids (ortho-, meta- or hypo-boric);

(ii) boronic acids;

(iii) boric anhydride;

(iv) boric esters, such as the propyl, butyl, etc., esters containing 1 or 2 B-OH, B-H or B-Cl groups;

(v) metal boranes, such as $K_2B_2H_6$;

(vi) boron halides (chloride, bromide, iodide);

(vii) chlorine borazole;

(viii) haloboranes, in particular chloroboranes;

(ix) organohaloboranes, in particular organochloroboranes, having a $C_1$–$C_{20}$ alkyl or aryl organic radical;

(x) aminoboric esters;

(xi) aminohaloboranes, in particular aminochloroboranes;

(xii) borazole;

(xiii) trihaloborazoles, in particular trichloroborazoles;

(xiv) organoboroxoles having a $C_1$–$C_{20}$ alkyl or aryl organic radical;

(xv) organoborazoles having a $C_1$–$C_{20}$ alkyl or aryl organic radical; and the like.

The boron compounds which are the preferred are boric acid $H_3BO_3$ and boric anhydride $B_2O_3$.

The condensation reaction is advantageously carried out at a temperature on the order of 130° to 300° C., preferably on the order of 160° to 220° C., and more preferably on the order of 170° to 210° C. The duration of this operation depends on the temperature used; this duration is generally on the order of 2 to 8 hours at a temperature on the order of 170° C. to 210° C.

The boron compound is advantageously present in an amount corresponding to a boron compound/aspartic acid + other amino acid(s) ratio, expressed in gram-atoms of B/COOH function, on the order of 10/1 to 1/20, preferably on the order of 3/2 to 1/4 and more preferably ranging from 1/1 to 1/2.

The boron compound may be removed via washing with water, or by extraction using a suitable solvent, if so desired.

According to the present invention, the polyanhydroaspartic acid typically is in the form of a solid mass. In the specific case of $H_3BO_3$, it is a flaky solid. If, at the end of the polymerization, a purification step is carried out, this step is conducted without any difficulty. It requires only the addition of water to the reaction medium, subsequent filtration, and drying of the polyanhydroaspartic acid thus recovered.

The polyanhydroaspartic acid obtained according to the invention is virtually white in color; its viscosity index, after dissolution in 0.5 N sodium hydroxide, is generally on the order of 12 to 20 ml/g.

It is, of course, where appropriate and on completion of the process according to the invention, possible to conduct an additional step of bleaching of the polyanhydroaspartic acid. This decoloration is preferably carried out using oxidizing agents of the hydrogen peroxide, hypochlorites, perborates, persalts (persulfates), etc., type.

In a preferred decoloration embodiment, hydrogen peroxide is used.

The polyanhydroaspartic acid obtained, whether separated or otherwise, may subsequently be hydrolyzed, preferably by addition of a basic agent (alkali metal or alkaline earth metal base, alkali metal or alkaline earth metal carbonate, etc.) in the presence of water, if necessary, in a homogeneous or two-phase medium. The hydrolysate thus obtained is a polyaspartate (for example sodium polyaspartate).

The acid form of the hydrolysate may be obtained, for example, by neutralization of the salt prepared via alkaline hydrolysis, using an organic or inorganic acid (in particular HCl). The hydrolysate thus obtained is a polyaspartic acid.

According to the invention, by "hydrolysate" is intended the product obtained by partial or total hydrolysis (by the action of water) of the polyanhydroaspartic acid formed. This hydrolysis provides, via opening of the imide rings, on the one hand, amide functions and, on the other, carboxylic acid functions or carboxylic acid salts.

The present invention also features industrial applications of the polyanhydroaspartic acids and hydrolysates thereof described above, in particular as "builders" or "cobuilders" in the detergent field. By "builder" or "cobuilder" is intended any constituent which improves the performance of the surface-active agents, or surfactants, of a detergent composition.

The amount of polyanhydroaspartic acid or hydrolysate formulated into such detergent compositions advantageously ranges from 0.2% to 80%, preferably from 2% to 10% by weight of the said detergent composition.

In order to further illustrate the present invention and the advantages thereof, the following specific examples are given, it being understood that same are intended only as illustrative and in nowise limitative.

EXAMPLES:

The following tests, the results of which are reported in the Table below, were carried out using boric acid $H_3BO_3$ or boric anhydride $B_2O_3$ as the boron compound.

Each test was carried out in a rotary evaporator, heated by means of an oil bath and under a gentle flush of nitrogen. The water of condensation was progressively removed by vaporization as it was formed.

The boron compound was removed at the end of the polymerization reaction simply by suspending the reaction medium in water. The resulting polyanhydroaspartic acid was subsequently recovered by filtration, washed with water and dried.

For purposes of comparison, polymerization tests were carried out at higher heating temperatures and in the absence of any boron compound.

The Table which follows reports the results obtained, as well as the various operating parameters, namely, aspartic acid, boric acid or boric anhydride concentration, heating temperature (bath temperature) and duration of heating, selected for each of the tests.

The polyaspartic acids obtained on conclusion of each of the processes were characterized by:

(a) Their % of NH groups ("nonconform moieties") of their imide moieties with respect to the total number of the CH groups of their succinimide moieties; this content was determined by proton NMR, by determining the integral ratio of the proton signals of NH imide groups ($\delta$=11.6 ppm) and of the proton signals of the succinimide CH groups ($\delta$=5.2 ppm), the spectra being recorded at 300 MHz after dissolving the polyanhydroaspartic acid in DMSO (dimethyl sulfoxide);

(b) The % of primary amide groups ("nonconform moieties") with respect to the secondary amide groups of the aspartic moieties of the hydrolysates (NaPA); this content was determined by proton NMR, by determining the integral ratio of the proton signals of the primary amide groups —CO—$NH_2$ ($\delta$=6.8 to 7.8 ppm) and of the proton signals of the secondary amide groups —CO—NH ($\delta$=8.0 to 8.6 ppm) of the polyaspartate chains, the spectra being recorded at 300 MHz after dissolving the polyanhydroaspartic acid in an $H_2O$ /$D_2O$ mixture (⁹⁵⁄₅), the pH thereof being adjusted to approximately 5;

(c) Their number of active moieties;

(d) Their viscosity index in sodium hydroxide;

(e) The biodegradability of their hydrolysate (polyaspartate); and (f) Their degree of coloration; which were respectively determined according to the following methodologies:

The number of active moieties (m. equivalents/kg of polyaspartic anhydride (PAA)), namely, the number of moieties which may be saponified to COO⁻, was determined by potentiometric back-titration. The titration was carried out as follows: an excess of 1 N NaOH was added and the mixture was maintained for 1 hour and then back-titrated with 1 N HCl.

The theoretical number of equivalents of COO⁻/kg of PAA was 10.3.

The viscosity index (VI) reported in these examples was measured by means of a SCHOTT AVS 350 capillary viscometer using a quantity of polyanhydroaspartic acid (PAA) dissolved in 0.5 N sodium hydroxide solution such as to provide a concentration of 0,002 g/ml at a temperature of 25° C.

The biodegradability of the hydrolysates (sodium polyaspartate NaPA) was measured according to the standard AFNOR T90–312 (in accordance with the international standard ISO 7827 of 15 Oct. 1984).

The test was carried out using:

(i) an inoculum obtained by filtration of inlet water of the municipal purification plant of Saint Germain au Mont d'Or (Rhône), as is or after adaptation, (ii) a test medium containing 4×10⁵ bacteria/ml, (iii) a quantity of product to be tested such that the test medium contained an organic carbon concentration on the order of 40 ml/g.

The degree of biodegradability was measured as a function of time under the conditions of discharge into river water.

For this measurement, the samples tested were obtained by hydrolysis of a dilute sodium hydroxide solution of the PAAs prepared, until an approximately 6% NaPA solution, having a pH on the order of 9 to 11, was obtained.

The level of biodegradability was characterized by the following two parameters:

(1) the maximum rate of biodegradation (MRB), (2) the time required to convert from a biodegradation rate of 10% to a rate of 90% of the maximum rate of biodegradation (t 10–90).

The level of coloration of the products obtained before and after removal of the boron compound by washing was determined by spectrocolorimetry according to the HUNTER L.a.b. method.

The results obtained collectively demonstrated that incorporation of $H_3BO_3$ or of $B_2O_3$ during the condensation of aspartic acid made it possible to prepare polyanhydroaspartic acids at least equivalent, in terms of viscosity index, to those obtained by thermal condensation, but at markedly lower temperatures, on the order of 30° to 50° C. In addition, compared with those prepared via a purely thermal route, these polyaspartic anhydrides or their hydrolysates:

(a') were markedly less colored, (b') had a higher viscosity index, although prepared at a lower condensation temperature, (c') had a markedly improved biodegradability.

TABLE

| Test | Charge AA* (g) | Charge Additive (g) | Charge B/COOH | Operating conditions T °C. bath | Operating conditions Duration (h) | Reaction product obtained Weight (g) | Reaction product obtained Coloration L | Reaction product obtained Coloration a | Reaction product obtained Coloration b |
|---|---|---|---|---|---|---|---|---|---|
| Control No. 1 | 50 | — | — | 230 | 5 | 37.2 | 87.3 | 4.1 | 12.2 |
| Control No. 2 | 50 | — | — | 190 | 6 | 48.3 | 89.9 | 2.6 | 11.2 |
| TESTS WITH $H_3BO_3$ | | | | | | | | | |
| A | 50 | 50 | 2.2/2 | 200 | 6 h, 50 min | 70.2 | 88.7 | −0.4 | 19.1 |
| B | 40 | 18.6 | ½ | 190 | 6 h, 10 min | 42.3 | 89.1 | 0.1 | 16.6 |
| C | 40 | 18.6 | ½ | 185 | 6 | 44.9 | 90.5 | −0.3 | 15.0 |
| D | 40 | 18.6 | ½ | 180 | 6 h, 45 min | 46.3 | 91.2 | −0.4 | 13.2 |
| E | 40 | 12.4 | ⅓ | 190 | 6 | 41.8 | 88.3 | 2.5 | 14.1 |
| F | 40 | 18.8 | ½ | 175 | 6 | 40.4 | 91.6 | −1.7 | 13.0 |
| G | 40 | 6.9 | 1/5.4 | 190 | 6 | 46.4 | 87.8 | 4.1 | 12.7 |
| TEST WITH $B_2O_3$ | | | | | | | | | |
| H | 50 | 13.1 | ½ | 190 | 6 | 55.5 | 88.5 | 1.9 | 13.41 |

| Test | Coloration L | Coloration a | Coloration b | *Potent. titration (eq/kg) | VI (ml/g) | Nonconform moieties PAA (%) | Nonconform moieties NaPA (%) | NaPA bio-degradability MRB (%) | NaPA bio-degradability t 10–90 (days) |
|---|---|---|---|---|---|---|---|---|---|
| Control No. 1 ⊖ | — | — | — | 9.19 | 8.9 | 7.6 | 6 | 70 | 6 |
| Control No. 2 ⊖ | | | | 7.73# | 2.2# | | | | |
| TESTS WITH $H_3BO_3$ | | | | | | | | | |
| A | 92.0 | 0.2 | 10.8 | 10.15 | | | | | |
| B | 94.0 | −0.7 | 9.1 | 10.27 | 18.5 | | | | |
| C | 94.5 | −0.6 | 7.3 | 10.14 | | | | | |
| D | 95.3 | −0.9 | 6.8 | 10.21 | | | | | |
| E | 93.2 | 0.4 | 8.5 | 10.05 | | | | | |
| F | 94.5 | −1.1 | 3.1 | 10.12 | | 0.1 | 0 | 93 | 6 |
| G | 90.6 | 1.7 | 7.5 | 9.64 | 17.5 | | | | |
| TEST WITH $B_2O_3$ | | | | | | | | | |
| H | 91.6 | 0.6 | 8.6 | 9.52 | 15.3 | 1 | 1 | 89 | 6 |

AA*: aspartic acid
*Potent. titration: potentiometric titration
PAA: polyanhydroaspartic acid
NaPA: sodium polyaspartate
⊖: measurements made on the unwashed reaction mass (no boron compound to be removed)
: these values were very close to those for pure aspartic acid

What is claimed:

1. A process for the preparation of a polyanhydroaspartic acid comprising not more than 3% of NH groups of the imide moieties thereof relative to the total amount of CH groups of the succinimide moieties thereof, comprising thermally polymerizing aspartic acid in the presence of a catalytically effective amount of at least one boron compound having at least one B-OH group, or precursor thereof.

2. A process for the preparation of a hydrolysate of a polyanhydroaspartic acid, having not more than 3% of primary amide groups relative to the secondary amide groups of the aspartic moieties thereof, comprising thermally polymerizing aspartic acid in the presence of a catalytically effective amount of at least one boron compound having at least one B-OH group, or precursor thereof, and thence hydrolyzing the polyanhydroaspartic acid thus obtained.

3. The process as defined by claim 1, comprising copolymerizing aspartic acid with at least one glutamic acid, glycine, alanine, valine, leucine, isoleucine, phenylalanine, methionine, histidine, proline, lysine, serine, threonine, or cysteine comonomer.

4. The process as defined by claim 1, carried out at a temperature ranging from about 130° to 300° C.

5. The process as defined by claim 1, wherein the boron compound is present in an amount corresponding to a boron compound/aspartic acid ratio, expressed in gram-atoms of B/COOH function, ranging from about $10/1$ to $1/20$.

6. The process as defined by claim 1, said boron compound or precursor thereof comprising a boric acid, boronic acid, boric anhydride, a boric ester, a metal borane, a boron halide, chlorine borazole, a haloborane, an organohaloborane, an aminoboric ester, an aminohaloborane, borazole, a trihaloborazole, an organoboroxole, or an organoborazole.

7. The process as defined by claim 6, said boron compound or precursor thereof comprising boric acid $H_3BO_3$ or boric anhydride $B_2O_3$.

8. The process as defined by claim 1, further comprising purifying the polyanhydroaspartic acid thus prepared.

9. The process as defined by claim 1, further comprising washing, filtering and drying the polyanhydroaspartic acid thus prepared.

10. The process as defined by claim 1, further comprising bleaching the polyanhydroaspartic acid thus prepared.

11. The process as defined by claim 10, comprising bleaching with hydrogen peroxide, a hypochlorite, a perborate, or a persalt.

* * * * *